INVENTOR.
Jack Germain
BY Mueller & Aichele
Attys.

INVENTOR.
Jack Germain
BY Mueller & Aichele
Attys.

INVENTOR.
Jack Germain
BY Mueller & Aichele
Attys.

Oct. 16, 1962 J. GERMAIN 3,059,184

TWO-WAY VEHICLE RADIO COMMUNICATION EQUIPMENT EMPLOYING HYBRID CIRCUITRY WITHIN A SECTIONALIZED CHASSIS

Filed July 27, 1959 6 Sheets-Sheet 4

INVENTOR.
Jack Germain
BY Mueller & Aichele
Attys.

INVENTOR.
Jack Germain
BY Mueller & Aichele
Attys.

INVENTOR.
Jack Germain
BY Mueller & Aichele
Attys.

United States Patent Office 3,059,184
Patented Oct. 16, 1962

3,059,184

TWO-WAY VEHICLE RADIO COMMUNICATION EQUIPMENT EMPLOYING HYBRID CIRCUITRY WITHIN A SECTIONALIZED CHASSIS

Jack Germain, Chicago, Ill., assignor to Motorola, Inc., Chicago, Ill., a corporation of Illinois
Filed July 27, 1959, Ser. No. 829,868
7 Claims. (Cl. 325—21)

This invention relates generally to communications equipment, and more particularly to two-way radio communications equipment for installation in vehicles for energization from the vehicle electrical system.

The use of communication systems to provide two-way communication between operators or other persons in moving vehicles and a central station, and also with each other, has come into widespread use over the past fifteen years. Initially such equipment was used primarily for providing communication for police officers, but systems have now come into widespread use for communicating with drivers of taxicabs and with operators of trucks and various other types of vehicles used by service organizations, and for providing communication of various sorts.

Because of the installation of the equipment in vehicles it is desired that the equipment be provided in compact form so that it can be used in a vehicle without interfering with other equipment therein, and with the normal operation of the vehicle. The equipment must be arranged for installation at a point remote from the operator, such as in the trunk of the vehicle, with the control available to the operator of the vehicle. Equipment adapted for various types of installation is desired.

Inasmuch as the electrical system of the vehicle is used as the source of power for the communication equipment, it is important that the power required be held low to thereby ease the load on the vehicle electrical system. Such electrical systems usually include a battery for providing energy for standby operation and a generator driven by the engine of the vehicle for charging the battery and for supplying energy to the various parts of the vehicle during operation of the engine. In the past it has been necessary to operate the engine in the vehicle so that the generator is operating when the communication equipment is used as the electrical power required was too great to be supplied by the battery alone. However, in many cases it is desirable to have the radio operative, at least for monitoring purposes, when the vehicle is not operating. These requirements of compactness and low power consumption must be met without sacrifice in performance. In particular it is important that the equipment operate within narrow channel spacings so that the present large demand for equipment can be satisfied without interference between various systems.

It is therefore an object of the present invention to provide an improved, compact two-way radio communications unit for use in vehicles.

Another object is to provide vehicular communication apparatus which requires reduced power for operation thereof, with the power required for standby condition being sufficiently low to be supplied by the battery of the vehicle without requiring operation of the vehicle engine to drive the generator of the electrical system in normal use.

Still another object of the invention is to provide two-way communication equipment including a receiver which utilizes transistors and is operated directly from the battery of the vehicle without the use of a power supply.

A further object of the invention is to provide mobile communication apparatus in which the various parts are provided as units easily removable for servicing and positioned to provide effective heat radiation therefrom.

A feature of the invention is the provision of a two-way commmunication system wherein the receiver is entirely transistorized and operates from the 12 volt vehicle electrical system without voltage conversion apparatus so that relatively small current is drawn thereby, and the transmitter includes transistor circuits such as for the audio stages, and tubes such as for the oscillating, multiplying and power amplifier stages, with a transistor power supply being provided for the tubes and being operated only when the transmitter is being used.

Another feature of the invention is the provision of a two-way communication system and a control unit therefore wherein the receiver may be energized from the electrical system of the vehicle when the engine thereof is not operating, and wherein the power supply of the transmitter may be energized from the vehicle electrical system only when the operating switch for the engine is closed so that the generator driven by the engine can provide power to the power supply for operation of the transmitter.

A further feature of the invention is the provision of a compact two-way communication unit including a receiver a transmitter, and a power supply for the transmitter provided as separate elements, with the power supply being positioned between the receiver and transmitter and having a heat radiator for cooling the active elements thereof, and the transmitter having a heat radiating member for cooling the high power elements thereof.

A still further feature of the invention is the provision of a communications unit including a plurality of sections which can be electrically and mechanically connected as an operating chassis unit and wherein access is provided to both sides of the sections for servicing, and with a housing for the unit including a base or mounting plate and a cover which are held in position with respect to the chassis unit by interlocking portions so that the unit can be easily removed from and secured in the housing.

The invention is illustrated in the following drawings wherein.

In practicing the invention there is provided a two-way communication unit which includes a receiver, a transmitter with a separate power supply, and a control head for operating the unit. The receiver is completely transistorized and operates from the nominal twelve volt electrical system of the vehicle in which it is installed without requiring a power supply. The power requirements of the receiver are sufficiently low that the receiver can be operated from the vehicle battery for extended periods of time when the generator is not operating to charge the same. The transmitter includes a power supply to provide the various voltages required for operation. The power supply is connected through the control head and is energized from the electrical system only when the ignition switch for the vehicle is operated, so that the transmitter will be operated only when the engine is running and the generator of the vehicle is operating. The components making up the main unit are arranged in a compact assembly with the receiver at the front end and the transmitter at the rear end. The power supply for the transmitter is adjacent the receiver and has heat conducting fins arranged to provide cooling of the transistors in the power supply. The high power components of the transmitter are positioned in a heat radiator at the end of the unit to provide cooling for the same. Accordingly the compact unit provides effective heat control and removal so that the transistors therein are held within the temperature range required for proper operation.

The sections of the unit are arranged to be electrically and mechanically interconnected to form an operating chassis unit in which parts are accessible for servicing. A housing is provided including a base or mounting plate which may be secured in a vehicle and a cover plate, with the chassis unit and housing being held in assembled relation by interlocking portions thereon. The control head may be secured directly to the main unit so that the entire equipment may be mounted under the dash of an automobile. Alternately the control head may be positioned remotely from the main unit and connected thereto through a cable, so that the main unit may be positioned in the trunk of the vehicle or in some other suitable place.

Figure 1:
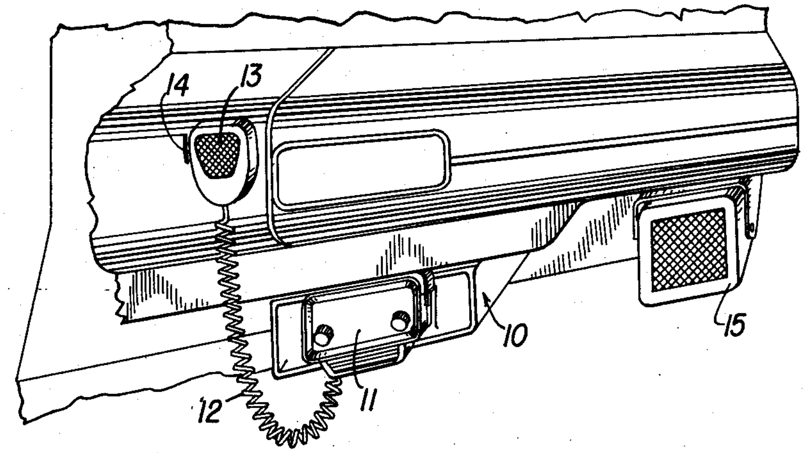
FIG. 1 illustrates the two-way communications equipment mounted under the dash of an automobile.

Referring now to the drawings, in FIG. 1 the communication unit is illustrated mounted under the dash of an automobile. The unit proper 10 extends toward the fire wall of the vehicle and the control head 11 is secured to the front thereof. Connected to the control head 11 by cable 12 is a microphone 13 which includes a push-to-talk switch 14 to be operated to condition the transmitter for operation. A speaker 15 is connected to the control head for reproducing received signals.

Figure 2:
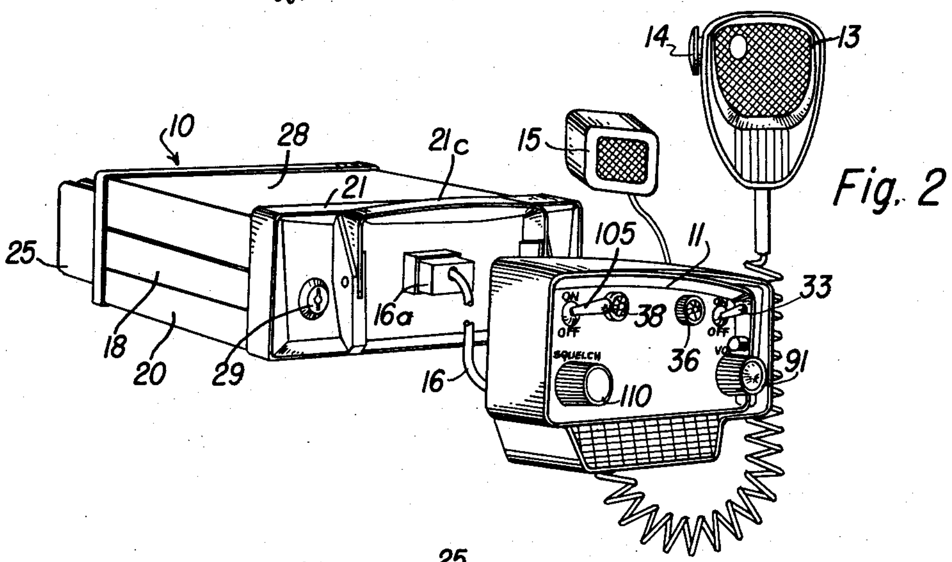
FIG. 2 illustrates the components of the equipment for mounting, with the control head separate from the main unit.

FIG. 2 shows the control head 11 separated from the main unit 10 and connected thereto by cable 16. The main unit may be mounted in any desirable location such as in the trunk of the vehicle and connected to the control head through the cable 16. The operating controls of the control head are shown and will be described in the description of operation of the unit.

Figure 3:
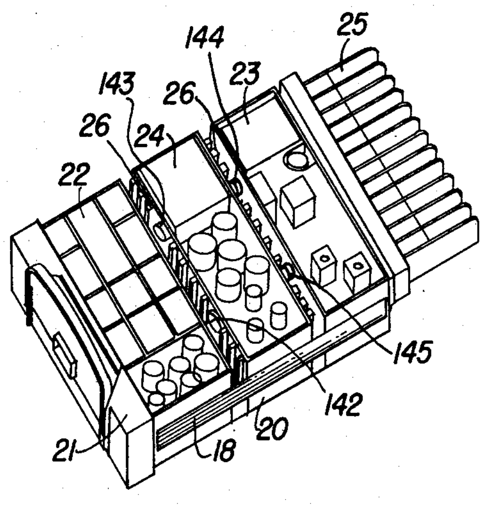
FIG. 3 illustrates the arrangement of the main components of the receiver, transmitter and power supply.

FIG. 3 shows the arrangement of the parts or sections of the communications unit. A front plate 21 is secured to the receiver 22 at the front of the chassis unit. The transmitter 23 is at the back, with the power supply 24 therefor positioned between the receiver 22 and transmitter 23. At the back of the transmitter is a heat radiating housing 25 for enclosing the high power elements of the transmitter. This provides effective heat control and removal so that the sections may be positioned in closely spaced relation. The power supply 24 includes power transistors whose thermal rise must be held within specified limits, and heat radiating elements 26 with fins are provided for the transistors on the sides of the power supply.

Figures 4, 6, 10:
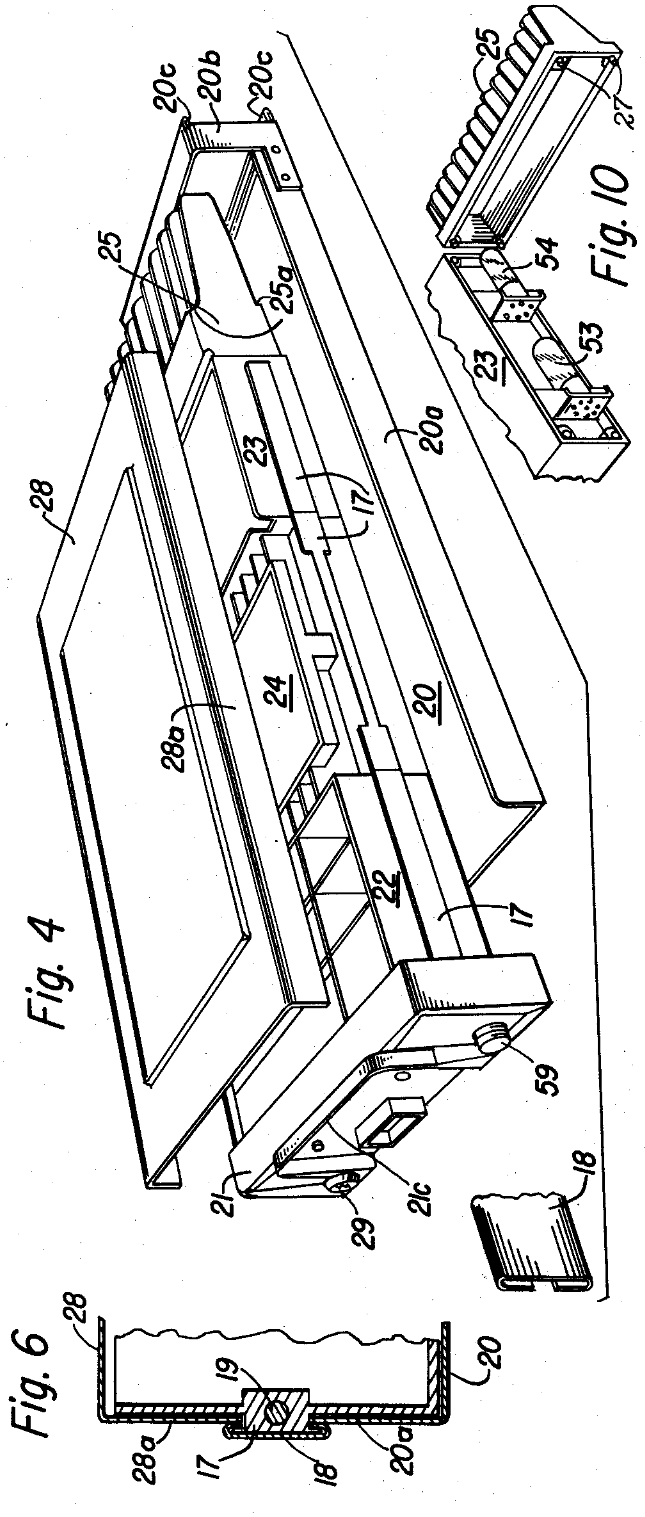
FIG. 4 is an exploded view showing the main chassis unit, the mounting plate and the cover in disassembled form.
FIG. 6 is a fragmentary cross section view showing the connection of the chassis sections with the side supports.
FIG. 10 shows the high power tubes and heat radiator therefor.
Figure 5:
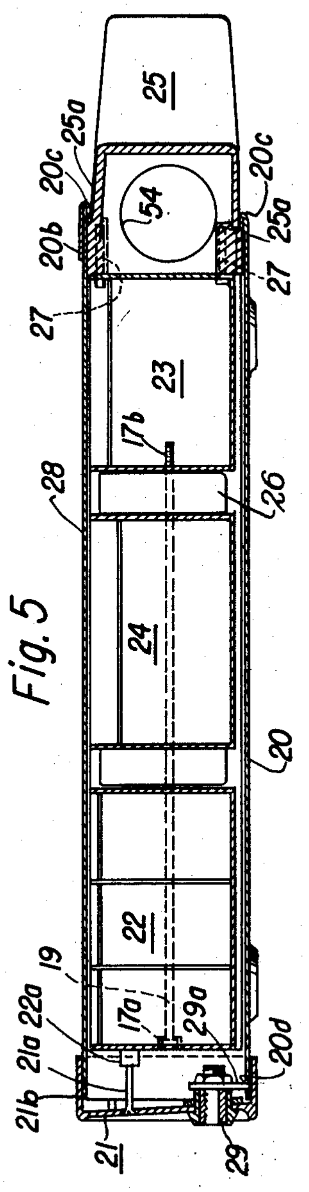
FIG. 5 is a cross section view through the assembled unit.

FIGS. 3 to 6 show the interconnection of the sections of the chassis unit and the housing therefor. The receiver section 22, transmitter section 23 and power supply section 24 are each provided with T-shaped ribs 17 along the sides thereof (FIG. 4). Channel members 18 on each side receive these ribs. The receiver unit 22 and the power supply unit 24 have openings in the ribs 17 thereof to receive threaded rods 19. Recesses **17*a* are provided in the receiver unit 22 (FIG. 5) for the heads of the rods and threaded openings 17*b* in the transmitter section receive the threaded ends of rods. Accordingly the rods hold the units 22, 23 and 24 in assembled relation, with the channels 18 completing the assembly of the structure. The heat radiator 25 for the transmitter is secured to the transmitter section 23 by screws 27, and the front plate 21 is secured to the receiver section 22 by screws 21*a* which extend into bosses 22*a*** provided on the receiver section. Accordingly the sections of the unit are all secured together and may be electrically connected into an operating chassis unit.

To provide a housing and mounting for the unit a mounting plate or base 20 is provided. As previously stated the unit may be mounted in different ways and the plate 20 forms the mounting element for the unit. When the chassis sections are interconnected they may be positioned on the base with the ribs 17 of the sections being supported on the sides **20*a* of the mounting base. The chassis unit may be slid on the base with the heat radiator 25 extending into a bracket portion 20*b* provided on the base. The base and bracket include inturned edges 20*c* which are engaged by edges 25*a* of the heat radiator 25 as the chassis is moved to position on the mounting base 20. A cover plate 28 is provided which extends over the chassis sections 22, 23 and 24 and has edges 28*a* which extend down into engagement with the ribs 17. The back edge of the cover 28 extends under the bracket 20*b* to hold the cover in place. When the chassis unit is moved all the way back in the frame the edge 21*b* on the front plate extends over the front edge of the cover 28 and also the front edge of mounting base 20**. This holds the chassis, mounting base and cover in assembled relation.

The chassis unit may be held in position on the mounting base 20 by a key operated latch 29 having a movable portion **29*a* which extends into slot 20*d* in the mounting plate. To service the unit it is merely necessary to release the latch 29 and slide the chassis unit forward. This makes it possible to remove the cover 28 and gives access to the top of the sections. The chassis unit may be completely removed from the mounting plate 20 to provide access to the bottom sides of the chassis units. A pivoted handle 21*c* is provided on the front plate to facilitate removal of the chassis unit and to make it easier to carry the complete unit. To disconnect the chassis it is only necessary to remove the connector 16*a* on cable 16 (FIG. 2) and to remove the antenna cable from the connector 59** (FIG. 4).

Figure 7:
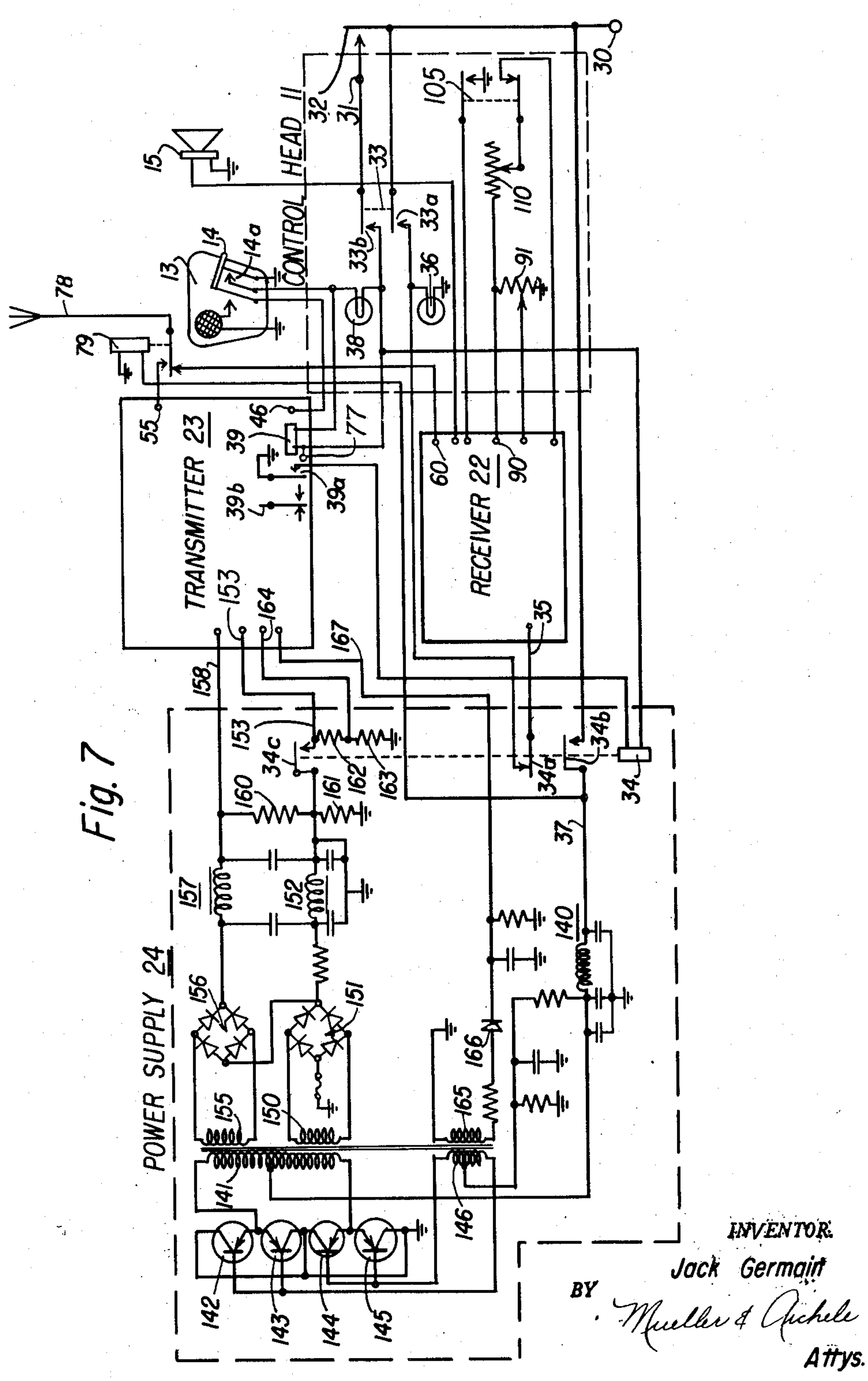
FIG. 7 is a schematic diagram showing the coupling of the components through the control head, and showing the circuit of the power supply.

FIG. 7 shows the intercoupling of the sections to the control unit 11. The control unit is shown interconnected with the receiver 22, transmitter 23, power supply 24, microphone 13 and loudspeaker 15. An antenna 78 is also shown which is selectively connected to the receiver 22 and the transmitter 23 through relay 79 which is mounted at the front of the unit. The control unit provides the various controls for energizing and operating the various sections of the communicating unit.

The control unit 11 is connected too the twelve volt electrical system of the vehicle at two points, first, to a terminal 30 which is continuously energized, and second to the terminal 31 which is energized through switch 32, which is the ignition switch of the vehicle. The terminal 31 is therefore energized only when the ignition switch of the vehicle is closed.

Power is supplied from terminal 30 through the contacts **33*a* of the main on-off switch 33 to the relay contacts 34*a*. This contact is normally connected to conductor 35 which energizes the receiver. The pilot light 36 will indicate when the receiver is energized. The terminal 31 is connected through a second contact 33*b* of the main on-off switch, through to terminal 77 to energize the transmitter tube heaters, and also through relay 39, and through contacts 14*a* of the push-to-talk switch 14. When relay 39 is energized, the contacts 39*a* thereof close to energize relay 34, provided that contacts 32 and 33b remain closed. This close contacts 34b to energize conductor 37 which is connected to the power supply 24 for the transmitter. Relay 39 has contacts 39b to control the transmission of control tones, and if this action is not required, the relay 39 may be omitted and the relay 34 may be controlled directly by the push-to-talk switch 14. The pilot light 38 indicates when the transmitter is energized, It will be apparent that when the ignition switch 32 is open it will not be possible to energize the relay 34** so that the power supply cannot be connected to the electrical system to be energized therefrom.

Microphone 13 is connected through the control unit to terminal 46 to apply audio signals to the transmitter, and the loudspeaker 15 is connected through the control unit to the receiver. A circuit energized through contacts 34b operates relay 79 to selectively connect the antenna 78 to the receiver 22 and the transmitter 23. When the relay 34 is not actuated, the receiver is energized and the antenna is connected to terminal 60 thereof. When the relay 34 is actuated and the transmitter is energized by power supply 24, the antenna is connected through relay 79 to terminal 55 of the transmitter.

Figure 8:
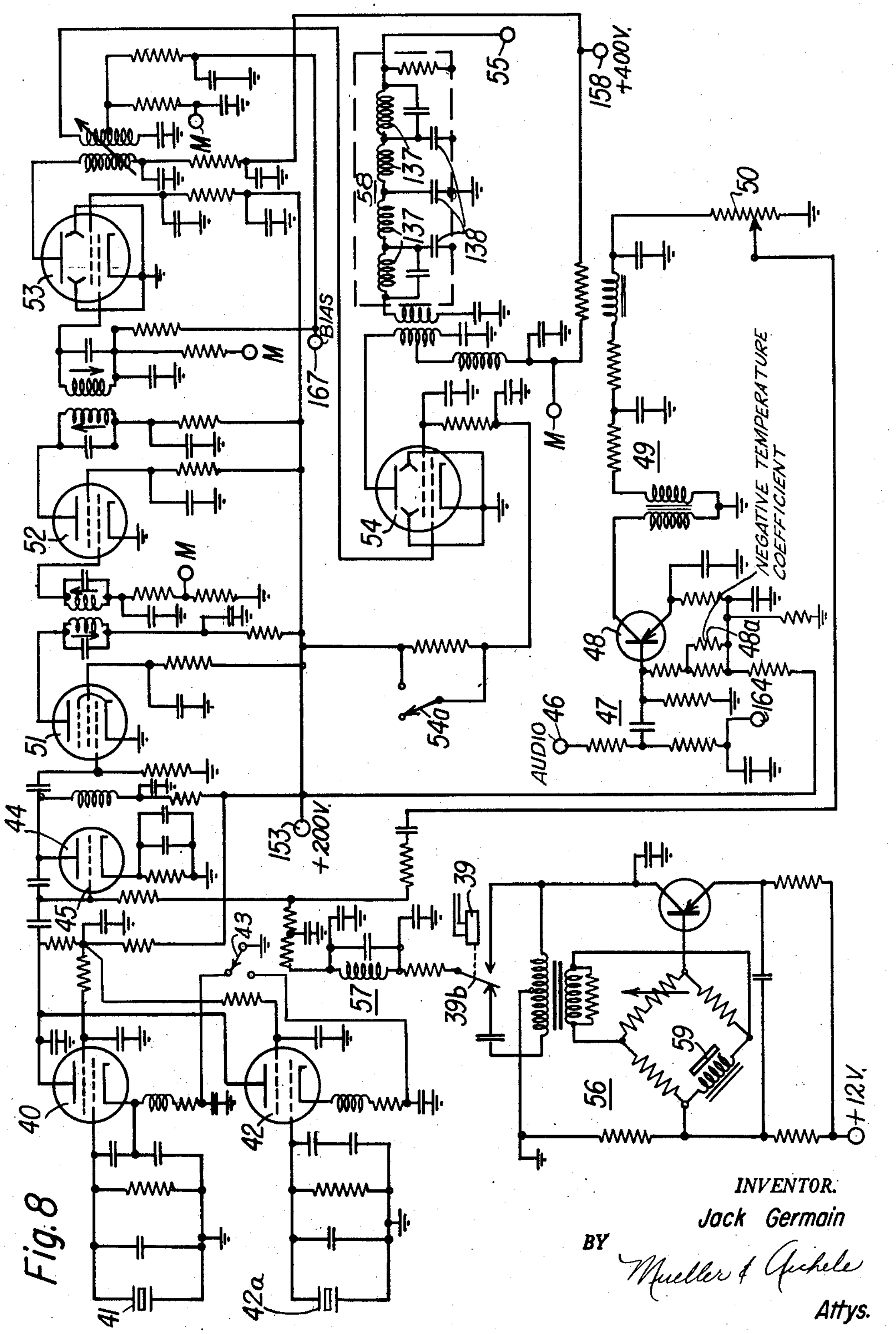
FIG. 8 is a schematic diagram of the transmitter of the unit.

Turning now to FIG. 8, this figure shows a schematic diagram of the transmitter. The transmitter includes electron tube 40 which is connected in an oscillator circuit, the frequency of which is controlled by crystal 41. Inasmuch as it may be desired to operate the transmitter on two different frequencies a second oscillator including tube 42 is provided, the frequency of which is controlled by crystal 42a. The oscillators 40 and 42 are selectively rendered operative by switch 43 which grounds the cathode to complete the circuit of one or the other oscillator. The oscillations from the circuit including tube 40 (or tube 42) are applied to the grid 45 of modulator tube 44. Also applied to the grid 45 are the audio signals to be transmitted. The microphone is connected to terminal 46 and applies audio signals thereto. The audio signals are applied to a deviation control circuit including differentiation network 47, an amplifier and symmetrical limiting circuit including transistor 48, and integration network 49. A negative temperature coefficient resistor 48a is provided to stabilize this circuit over a wide range of temperatures. This provides audio signals at the proper level for the modulator and controls the signal so that over modulation cannot take place. A controlled amount of the audio signal is derived from potentiometer 50 and applied to the grid 45.

The modulator 44 produces phase modulation of the carrier wave and the frequency and deviation are increased through the succeeding multiplier stages. The circuit including electron tube 51 may serve as a tripler and the circuits including tubes 52 and 53 as doublers. The circuit including tube 53 also serves as a driver for the power amplifier 54. A switch 54a is provided for reducing the screen potential to tube 54 to provide low power operation for tuning up the transmitter. When the switch is closed full power output is provided. The output of the power amplifier is applied through harmonic filter 58 to terminal 55 which is connected to the antenna relay in the control unit for applying the signals from the transmitter to the antenna for radiation. Various meter terminals indicated M are shown on the circuit of FIG. 8. These are provided to facilitate test and servicing of the transmitter.

The transmitter of FIG. 8 may also include a tone generator 56 which applies tones through relay contacts 39b to low pass filter 57 and to the grid 45 of the modulator. Contacts 39b are part of the transmitter relay 39 shown in FIG. 4 and apply tones of opposite polarity when the relay 39 releases. The relay 34 which energizes the transmitter is slow to release so that the tones applied when relay 39 releases will still be transmitted. The tone generator 56 is of the bridge type having a reed device 59 as the main frequency controlling element. The tones are used to selectively render the receivers of various other communication units operative so that communication can be established with predetermined desired units.

The circuit of the power supply for the transmitter is shown in FIG. 7. As previously stated the receiver does not require a power supply. When the push-to-talk switch is operated the conductor 37 connects the 12 volt potential to the power supply. This is applied through filter 140 to the transistor switching circuit. This circuit includes transformer winding 141 having a central tap to which the potential is applied, and end terminals one of which is connected to transistors 142 and 143 and the other of which is connected to transistors 144 and 145. The transistors of each pair are connected in parallel, with the transformer being connected to the emitter electrodes and the collector electrodes being connected to a reference point. The transistors are therefore connected in series with a portion of the winding 141 across the power supply. To control the switching action of the transistors, the transformer has a feedback winding 146 with a central terminal to which a bias potential is applied and end terminals connected to the base electrodes of the transistors. In this circuit the transistors 142 and 143 conduct to apply current in one polarity through the winding 141 and then the transistors 144 and 145 conduct to apply current in the opposite direction.

The alternating voltage developed in winding 141 is applied through secondary winding 150 to a rectifier bridge 151 the output of which is applied through filter 152 and relay contacts 34c to a first output terminal 153. The turns ratio of the transformer is such that the voltage is stepped up and the output voltage at terminal 153 may be 200 volts. This will provide the potential for the terminal marked 200 volts on the transmitter circuit of FIG. 8. A similar system including secondary winding 155, rectifier bridge 156 and filter 157 may provide an additional 200 volts, which is added to the 200 volts at terminal 153 to provide an output of 400 volts at terminal 158. A bleeder string including resistors 160, 161, 162 and 163 is connected across the high voltage terminals and has a tap 164 providing voltage for the microphone when the power supply is energized. This is applied to the terminal 164 of the transmitter (FIG. 8). A negative bias potential is provided at terminal 167 by the circuit including winding 165 and rectifier 166. This is applied to the terminal 167 connected to the grid circuits of the high power tubes 53 and 54 of the transmitter (FIG. 8).

For proper operation of the transistors 142, 143, 144 and 145 of the power supply, the heat developed therein must be effectively removed. Accordingly these transistors are mounted on the heat radiating elements 26 of FIG. 3. The heat radiating elements conduct heat from the transistors so that they are maintained at the required operating temperature.

Figures 9, 12:
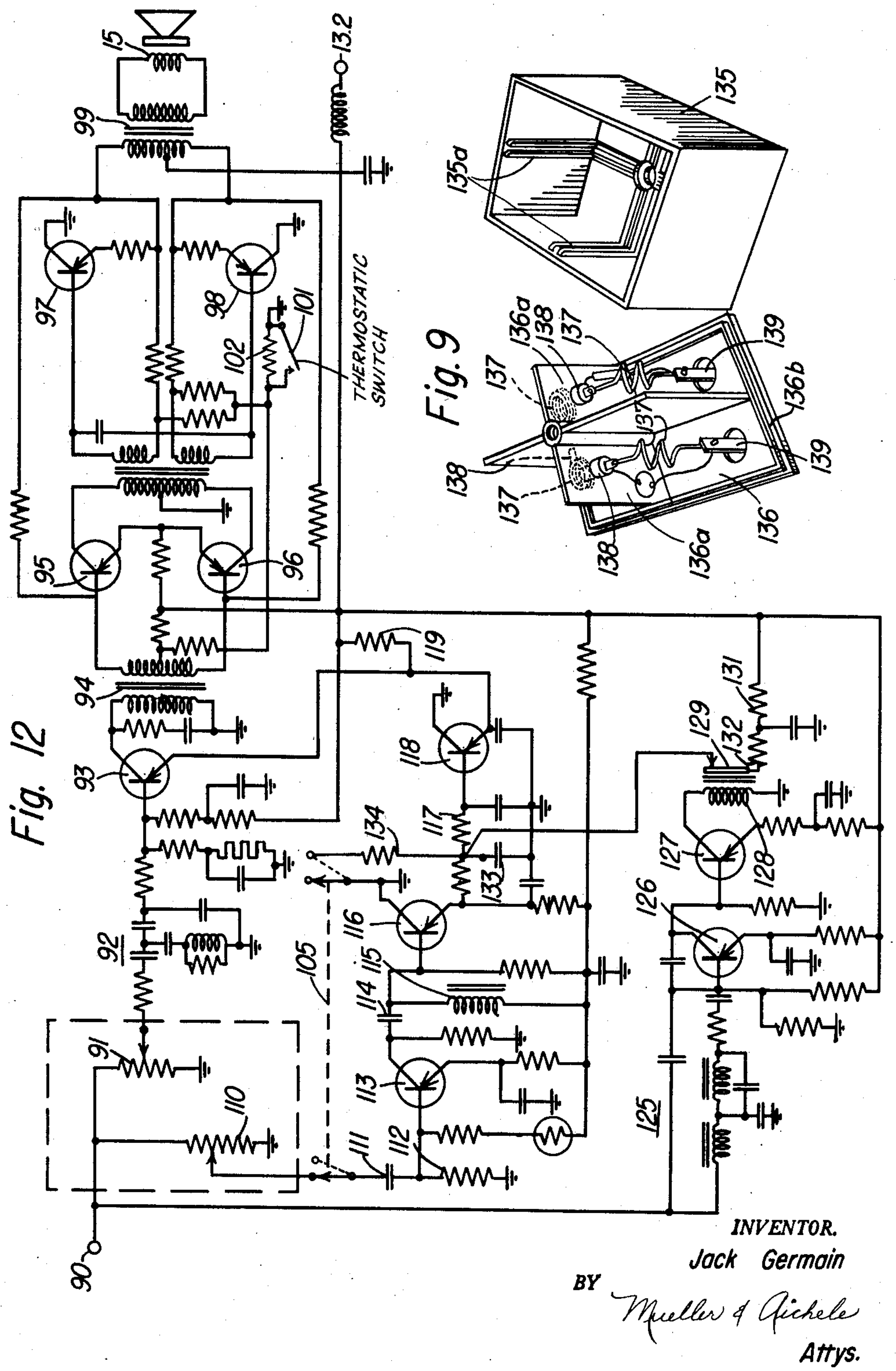
FIG. 9 shows the construction of the harmonic filter and shield of the transmitter.
FIG. 12 is a schematic diagram of the audio section of the receiver.

The construction of the harmonic filter 58 of the transmitter is shown in FIG. 9. This includes a housing member 135 and a cover member 136 which may be die cast of a zinc or aluminum alloy. The cover member includes partitions 136a which fit in grooves provided by ribs 135a in the housing member and ribs 136b which fit inside the open edges of the housing member to form four well shielded compartments. A coil 137 is provided in each compartment with connections between the coils being provided by feed through capacitors 138 which form the shunt capacitors of the harmonic filters as shown in FIG. 8. Connection to the filter is made by terminals 139 extending through the cover member 136. This construction provides very effective shielding in a compact and inexpensive unit.

FIG. 10 shows the cooperation of the heat radiator 25 with the power tubes 53 and 54. These tubes with coupling elements are mounted on the back of the transmitter section 23. The heat radiator or dissipator 25 forms a cavity into which the tubes extend. The inside of the cavity is painted to provide effective heat absorption. A dull black paint has been found to be effective for this purpose. The heat from the tubes is radiated to the dissipator 25 and removed therefrom by radiation, convection and conduction. This construction, which requires no heat conduction connection to the tubes, has been found to be highly satisfactory, and is much simpler than an arrangement requiring a physical connection to the tubes.

Figure 11:
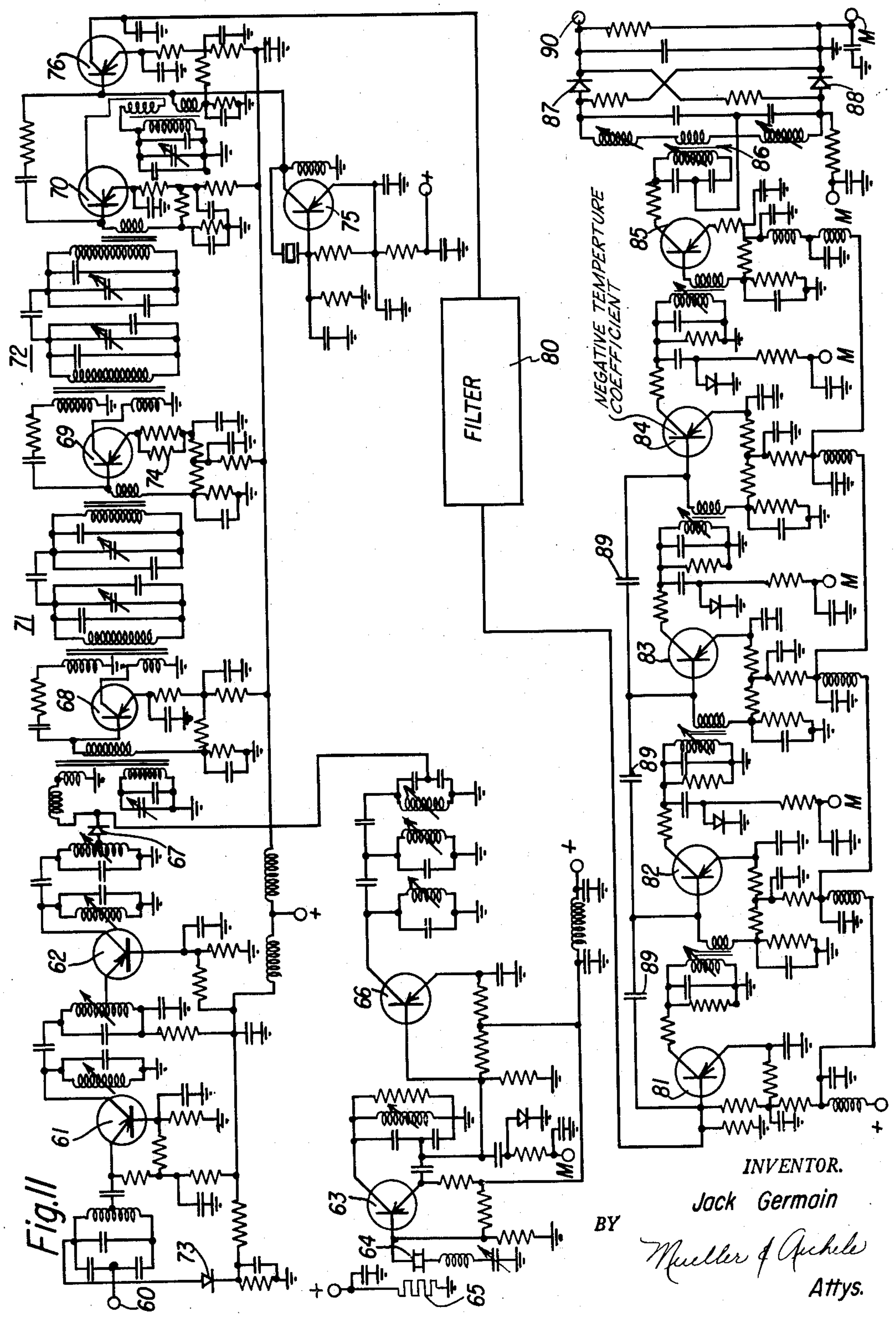
FIG. 11 is a schematic diagram of the receiver up through the discriminator.

Considering now the receiver shown in FIG. 11, signals from the antenna are applied to input terminal 60 and are amplified in the radio frequency amplifiers including transistors 61 and 62. A diode 73 is connected to the input circuit to load the circuit at high signal levels and thereby decouple the receiver from the antenna. Therefore strong signals do not damage the transistors 61 and 62. The receiver illustrated is of the superheterodyne type and is adapted for operation in the frequency range from 150 to 174 megacycles. It is to be pointed out however that receivers of other types and operating at other frequencies may be provided. Local oscillations are produced by an oscillator including transistor 63, with the crystal 64 controlling the frequency. A heater 65 is provided to hold the crystal within a predetermined temperature range so that the frequency will remain within the desired limits. The output of the oscillator is applied to a multiplier including transistor 66. This may multiply the frequency any desired number of times, as for example, five times, to provide the desired oscillator frequency. The radio frequency signals and the oscillations are heterodyned in diode mixer 67 to provide intermediate frequency signals.

The intermediate frequency signals are amplified in the first intermediate frequency amplifier including transistors 68, 69 and 70. The stage including transistor 69 has a negative temperature coefficient resistor 74 connected to the emitter electrode to reduce the degeneration and thereby increase the gain as the temperature rises. Frequency selective networks 71 and 72 are provided to select the intermediate frequency signal. The first intermediate frequency signals are mixed with signals from a second crystal oscillator 75 in the second mixer 76. This produces signals of a second lower intermediate frequency which are applied to filter 80. The filter 80 may be a fixed passive filter which selects the signals in the desired channel with respect to the signals in adjacent channels and provides extremely sharp selectivity.

The selected signals are applied to a second intermediate frequency section including a three stage amplifier which includes the transistors 81, 82 and 83. The amplified intermediate frequency signals are then applied to a two-stage limiter including transistors 84 and 85. It is pointed out that under extremely strong signal conditions the amplifier stages 82 and 83 may provide some limiting action, and the limiter stages including transistors 84 and 85 will provide strong limiting so that the output signals are of substantially constant amplitude when the received signals vary through a wide range of amplitude. Neutralization is provided by capacitors 89 connected between the adjacent stages 81, 82, 83 and 84. The output of the limiter is applied to the frequency discriminator which includes a discriminator transformer 86 and diodes 87 and 88. The discriminator provides the audio output at terminal 90. Various meter terminals are indicated M on the circuit of FIG. 11.

The audio portion of the receiver is illustrated in FIG. 12. Coupled to the terminal 90 of the discriminator is a potentiometer 91 from which a selected portion of the audio signal is applied through filter network 92 to the first audio amplifier 93. The first audio amplifier 93 is coupled to transformer 94 which provides a balanced output to the push-pull driver stage including transistors 95 and 96. The driver stage feeds a push-pull output stage including transistors 97 and 98. The output stage is coupled through transformer 99 to the loudspeaker 15 which reproduces the received signals. In order to compensate the audio amplifier for changes in temperature, a thermostatic switch 101 is provided across a resistor 102 in the bias circuit for transistors 95, 96, 97 and 98. When the temperature increases above a predetermined value, the switch 101 opens to reduce the forward bias applied to the base electrodes of the transistors to compensate for increased conductivity resulting from increased temperature.

The receiver includes circuits providing carrier squelch operation and selective squelch operation. Potentiometer 110 connected to terminal 90 applies a part of the audio output from the discriminator through a contact of switch 105 to the carrier squelch circuit. It is to be pointed out that potentiometer 110, as well as potentiometer 91 in the audio circuit, are provided in the control unit 11 so that the operator can control the squelch operation as well as the audio volume. Switch 105 is also provided in the control unit, and the position shown provides both carrier and selective squelch operation, while in the dotted position only selective operation is provided.

The speech signals and noise derived from potentiometer 110 are applied through capacitor 111 and across resistor 112 to transistor 113. These signals are amplified and limited in transistor 113, with the output being selected by the filter formed by capacitor 114 and coil 115 which selects only noise above the speech frequencies. The noise signals are rectified by transistor 116 and applied to filter 117 which smoothes the control voltage coupled to the base of transistor 118. The emitter of transistor 118 is connected to the potential source through resistor 119. The emitter of transistor 93 in the audio amplifier is also connected to resistor 119, and the bias applied thereto normally holds the transistor 93 conducting. However, when the transistor 118 conducts the voltage drop across resistor 119 lowers the voltage on the emitter of transistor 93 so that the transistor 93 is rendered non-conducting to thereby squelch the receiver. The noise voltage rectified by transistor 116 normally holds transistor 118 conducting, but when a carrier is received the noise is reduced and transistor 118 ceases to conduct, and this allows transistor 93 to conduct.

For remote selective operation, the squelch circuit is operated in response to tones transmitted from a transmitter in the system. This action is provided by the circuit including frequency selective network 125 connected to the terminal 90 which selects the low frequency tones from the audio output of the discriminator. The tones selected by the network 125 are amplified in the circuit including transistors 126 and 127. The transistor 127 controls frequency selective reed device 128 to cause the contact 129 thereof to operate intermittently when a particular tone is received. The contact 129 of device 128 applies potential through resistors 131 and 132 to charge capacitor 133. For such operation the switch 105 (provided in control unit 11) is placed in its dotted position so that resistor 134 is grounded. Operation of contact 129 provides a voltage across capacitor 133 which causes the transistor 118 to be cut off and this permits the transistor 93 to conduct as previously stated. When the reed device 128 is not operated in response to a desired tone, and the contact 129 is open, the potential applied to the base of transistor 118 is reduced so that this transistor conducts. This cuts off the transistor 93 so that audio signals are not reproduced.

The communications apparatus in accordance with the invention is provided as a compact unit which may be easily installed in automobiles or other vehicles. The sections of the unit are arranged so that they are easily accessible for servicing. The parts are arranged to provide effective heat control so that the transistors and other critical components are held within the proper operating temperatures. The power consumption of the unit is of a value such that it does not form an excessive load for the vehicle electrical systems, and the receiver drain is such that it may be provided by the vehicle battery without requiring operation of the generator to supply additional electrical energy in normal use.

I claim:

1. Communications apparatus for use in a vehicle having an electrical system and a switch for making a circuit connection to the electrical system, said apparatus including in combination, a chassis assembly having a front plate, a control unit connected to said front plate, a first terminal for connection to the electrical system for providing the voltage thereof, a second terminal for connection to the switch for providing the voltage of the electrical system when the switch is closed, a transistorized receiver section connected to said front plate and operating directly from the voltage of the vehicle electrical system, said receiver section including temperature responsive means for compensating for changes in the transistor characteristics with change in temperature, a transmitter section at the rear of said chassis assembly and including components requiring operating voltages greater than the voltage of the electrical system, said transmitter section including heat radiating housing means for components thereof extending at the rear of said chassis assembly, a power supply section for providing the voltage required for operation of said transmitter section, said power supply section including a plurality of transistors and drawing greater power from the electrical system for operating said transmitter means than the power drawn by said receiver, said power supply section being positioned between said receiver section and said transmitter section and having a heat radiating member for said transistors, relay means having first and second sets of contacts, main switch means having first and second sets of contacts, with said first sets of contacts of said relay means and said main switch means providing an energizing circuit from said first terminal to said receiver when said relay is in released position, transmit switch means for controlling the operation of said transmitter means, and a control circuit for said relay means connected to said second terminal and including said second set of contacts of said main switch means and said transmit switch means, said control circuit causing activation of said relay means so that said second set of contacts thereof connects said power supply means to said first terminal to complete an energizing circuit for said power supply means, whereby said power supply means is energized only when the switch of the vehicle and said main switch means and said transmit switch means are all operated.

2. Communications apparatus for use in a vehicle having an electrical system and a switch for making a circuit connection to the electrical system, said apparatus including in combination, a rectangular mounting base, a transistorized receiver for operating directly from the voltage of the vehicle electrical system supported on said base adjacent the front thereof, a front panel connected to said receiver, a control unit connected to said front panel, transmitter means supported on said base at the rear thereof and including components requiring operating voltages greater than the voltage of the electrical system, said transmitter means including heat radiating means for components thereof and power supply means for providing the operating voltages required thereby, said power supply means being positioned on said base between said receiver and said transmitter means and including a transistor and heat radiating means therefor, said power supply means drawing greater power from the electrical system for operating said transmitter means than the power drawn from said receiver, a first terminal for connection to the electrical system for providing the voltage thereof, a second terminal for connection to the switch for providing the voltage of the electrical system when the switch is closed, relay means having contact means connected to said receiver and to said power supply means, main switch means having first and second sets of contacts, with said first contacts selectively connecting said contact means of said relay means to said first terminal, said relay means having a released position in which an energizing circuit is completed through said contacts thereof to said receiver, transmit switch means for controlling the operation of said transmitter means, and a control circuit for said relay means connected to said second terminal and including said second set of contacts of said main switch means and said transmit switch means, said control circuit causing operation of said relay means so that said contact means connects said power supply means to said first terminal to complete an energizing circuit for said power supply means, whereby said power supply means is energized only when the switch of the vehicle and said main switch means and said transmit switch means are all operated.

3. Communications apparatus for use in a vehicle having an electrical system and a switch for making a circuit connection to the electrical system, said apparatus including in combination, a mounting base, a transistorized receiver section supported on said base at the front thereof for operating directly from the voltage of the vehicle electrical system, a front plate connected to said receiver section, a control unit connected to said front plate, a transmitter section supported on said base at the rear thereof and including components requiring operating voltages greater than the voltage of the electrical system, said transmitter means including heat radiating means for high power components thereof, a power supply section providing operating voltages required by said transmitter section positioned on said base between said receiver and said transmitter means and including a transistor and heat radiating means therefor, each of said sections having T-shaped ribs extending from the sides thereof, a pair of channel members receiving said ribs, securing means holding said sections together to form a chassis unit, a top cover for said chassis unit, said mounting base having a bracket at the rear for receiving the rear of said chassis unit and said cover, said front plate having an edge engaging the front of said mounting base and said cover, latch means connecting said front plate to said mounting base to hold said cover and said mounting base assembled about said chassis unit, relay means having contact means connected to said receiver and to said power supply means, main switch means in said control unit having contacts selectively connecting said contact means of said relay means to the electrical system, said relay having a released position in which an energizing circuit is completed to said receiver, transmit switch means for controlling the operation of said transmitter means, and a control circuit for said relay means connected to the electrical system through the switch of the vehicle and including said transmit switch means and said contacts of said main switch means, said control circuit causing operation of said relay means to connect said power supply means to the electrical system, whereby said power supply means is energized only when the switch of the vehicle and said main switch means and said transmit switch means are all operated.

4. Communications apparatus for use in a vehicle having an electrical system and a switch for making a circuit connection to the electrical system, said apparatus including in combination, a transistorized receiver for operating directly from the voltage of the vehicle electrical system, transmitter means including components requiring operating voltages greater than the voltage of the electrical system, said transmitter means including high power components with heat radiating means therefor and power supply means for providing the operating voltages required thereby, said power supply means including a transistor and heat radiating means therefor and drawing greater power from the electrical system for operating said transmitter means than the power drawn by said receiver, an antenna control means for the apparatus including a control head, relay means having contact means connected to said receiver and said power supply, main switch means on said control head having contacts selectively connecting said contact means of said relay means to the electrical system, said relay having a released position in which an energizing circuit is completed to said receiver, transmit switch means for controlling the operation of said transmitter means, and a control circuit for said relay means including said transmit switch means and said contacts of said main switch means and connected to the electrical system through the switch of the vehicle, said control circuit causing operation of said relay means to connect said power supply means to the electrical system, whereby said power supply means is energized only when the switch of the vehicle and said main switch means and said transmit switch means are all operated, said transmitter means including output filter means having a first conducting box-like member with five closed sides and one open side, a second conducting member having a cover portion and two intersecting right angle partition portions which extend therefrom, said members when assembled with said cover portion closing said open side of said box-like member forming four separate shielded cavities, said members being die cast and having ribs to provide interlocking fit therebetween, four inductance elements supported on said second member with one positioned in each of said cavities, three feed through capacitors in said partition portions interconnecting said inductance elements in series and forming shunt capacitors of a filter circuit, and terminal means extending through said cover portion and connected to said inductance elements to form end terminals of the filter circuit, and means operated by said relay means for selectively connecting said receiver and said output filter means to said antenna.

5. Communications apparatus for use in a vehicle having an electrical system and a switch for making a circuit connection to the electrical system, said apparatus including in combination, a chassis including transistorized receiver means at the front thereof for operating directly from the voltage of the vehicle electrical system, transmitter means at the rear of said chassis including components requiring operating voltages greater than the voltage of the electrical system and power supply means for providing the operating voltages required thereby, said transmitter means including heat radiating means extending from the rear of said chassis for components of said transmitter which produce substantial heat, said power supply means including a transistor and heat radiating means therefor, said power supply means drawing greater power from the electrical system for operating said transmitter means than the power drawn by said receiver means, a first terminal for connection to the electrical system of the vehicle for providing the voltage thereof, a second terminal for connection to the switch of the vehicle for providing the voltage of the electrical system when the switch is closed, control means including relay means having contact means connected to said receiver means and to said power supply means, said control means including main switch means having first and second sets of contacts, with said first set of contacts selectively connecting said contact means of said relay means to said first terminal, said relay means having a released position for completing an energizing circuit through said contacts therefor to said receiver means, transmit switch means for controlling the operation of said transmitter means, and a control circuit for said relay means connected to said second terminal and including said second set of contacts of said main switch means and said transmit switch means, said control circuit causing operation of said relay means so that said contact means connects said power supply means to said first terminal to complete an energizing circuit for said power supply means, whereby said power supply means is energized only when the switch of the vehicle and said main switch means and said transmit switch means are all operated.

6. Communications apparatus for use in a vehicle having an electrical system, said apparatus including in combination, a rectangular mounting base, a transistorized receiver for operating directly from the voltage of the vehicle electrical system supported on said base adjacent the front thereof, a front panel connected to said receiver, a control unit connected to said front panel, a transmitter supported on said base at the rear thereof and including components requiring operating voltages greater than the voltage of the electrical system, said transmitter including heat radiating means for components thereof extending from the rear thereof beyond said mounting base, and power supply means for providing the operating voltages required thereby by said transmitter and including a transistor and heat radiating means therefor, said power supply means having at least a portion positioned on said mounting base between said receiver and said transmitter, said power supply means drawing greater power from the electrical system for operating said transmitter than the power drawn by said receiver, terminal means for connection to the electrical system of the vehicle for providing the voltage thereof, relay means having contact means connected to said receiver and to said power supply means, main switch means having contacts selectively connecting said contact means of said relay means to said terminal means, said relay means having a released position for completing an energizing circuit through said contacts thereof to said receiver, transmit switch means for controlling the operation of said transmitter means, and a control circuit for said relay means connected to said terminal means and including said contacts of said main switch means and said transmit switch means, said control circuit causing operation of said relay means so that said contact means thereof connects said power supply means to said terminal means to complete an energizing circuit for said power supply means, whereby said power supply means is energized only when said main switch means and said transmit switch means are operated.

7. Communications apparatus for use in a vehicle to provide two-way radio communications including in combination, a transistorized receiver section, a transmitter section having high power elements which produce substantial heat, each of said sections having ribs extending along opposite sides thereof, power supply means for energizing said transmitter section, securing means for holding said sections and said power supply means together to form a chassis unit, said receiver section being at the front of said chassis unit and said transmitter section being at the rear thereof with said high power elements extending from the rear of said chassis unit so that the heat applied thereby to said transistorized receiver section is minimized, heat radiating means secured to said transmitter section and having a cavity for receiving said high power elements, a rectangular mounting plate having upturned sides and front and rear ends with a bracket at the rear end thereof including an open frame portion, said mounting plate reeciving said chassis unit with said ribs resting on said sides thereof and said heat radiating means extending through the open frame portion of said bracket to the rear of said mounting plate, a front plate connected to the front of said chassis unit and having inturned edges, a top cover positioned over said chassis unit and having sides extending downwardly to said ribs, said cover having front and rear ends with said rear end being retained by said bracket, said inturned edges of said front plate surrounding said front end of said mounting plate and said front end of said cover, and latch means on said front plate cooperating with said mounting plate to hold said front plate in position such that said mounting plate and said cover are held assembled thereby, said mounting plate, top cover, front plate and heat radiating means cooperating with said chassis unit to provide a completely enclosed structure.

References Cited in the file of this patent

UNITED STATES PATENTS

| | | |
|---|---|---|
| 2,446,701 | Greene | Aug. 10, 1948 |
| 2,606,091 | Buchy et al. | Aug. 5, 1952 |
| 2,731,555 | Beck | Jan. 17, 1956 |
| 2,810,071 | Race | Oct. 15, 1957 |
| 2,888,652 | Niederman et al. | May 26, 1959 |